United States Patent
Bowers

(10) Patent No.: US 7,806,437 B2
(45) Date of Patent: Oct. 5, 2010

(54) ROLL BAR ASSEMBLY

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 298 days.

(21) Appl. No.: 12/115,099

(22) Filed: May 5, 2008

(65) Prior Publication Data

US 2009/0273169 A1 Nov. 5, 2009

(51) Int. Cl.
    *B60R 21/13* (2006.01)
(52) U.S. Cl. ....................................... 280/756
(58) Field of Classification Search ............... 280/756; 296/102
    See application file for complete search history.

(56) References Cited

U.S. PATENT DOCUMENTS

| | | | |
|---|---|---|---|
| 3,622,177 A | 11/1971 | Notestine et al. | |
| 3,918,740 A * | 11/1975 | Notestine | 280/756 |
| 4,148,504 A * | 4/1979 | Rushing | 280/756 |
| 4,171,141 A * | 10/1979 | Hobrecht | 280/756 |
| 4,772,068 A * | 9/1988 | Gleckler et al. | 297/39 |
| 4,795,188 A * | 1/1989 | Dueker | 280/756 |
| 4,798,399 A | 1/1989 | Cameron | |
| 4,900,058 A * | 2/1990 | Hobrecht | 280/756 |
| 5,139,308 A * | 8/1992 | Ziman | 297/188.06 |
| 5,464,270 A * | 11/1995 | Chang | 297/81 |
| 6,206,462 B1 * | 3/2001 | Huang | 297/39 |
| 6,450,569 B1 * | 9/2002 | Liu | 297/39 |
| 6,517,111 B2 | 2/2003 | Mizuta | |
| 6,595,582 B1 * | 7/2003 | Liu | 297/35 |
| D513,223 S | 12/2005 | Saito et al. | |
| 7,175,200 B1 | 2/2007 | Obershan | |
| 2004/0079561 A1 | 4/2004 | Ozawa et al. | |
| 2004/0080148 A1 | 4/2004 | Brennan | |
| 2006/0038431 A1 * | 2/2006 | Liu | 297/21 |

* cited by examiner

*Primary Examiner*—Paul N Dickson
*Assistant Examiner*—Robert A Coker
(74) *Attorney, Agent, or Firm*—Ulmer & Berne LLP

(57) ABSTRACT

A roll bar assembly is provided that includes a base member configured for mounting on a frame of a vehicle. The roll bar assembly also includes an upper member secured to the base member and an armrest member secured to the upper member. The armrest member includes first and second armrests spaced apart from one another and also includes a connecting portion extending between and interconnecting the first and second armrests. The connecting portion of the armrest member is spaced apart from the base member and the upper member and is configured for mounting on the frame of the vehicle.

28 Claims, 7 Drawing Sheets

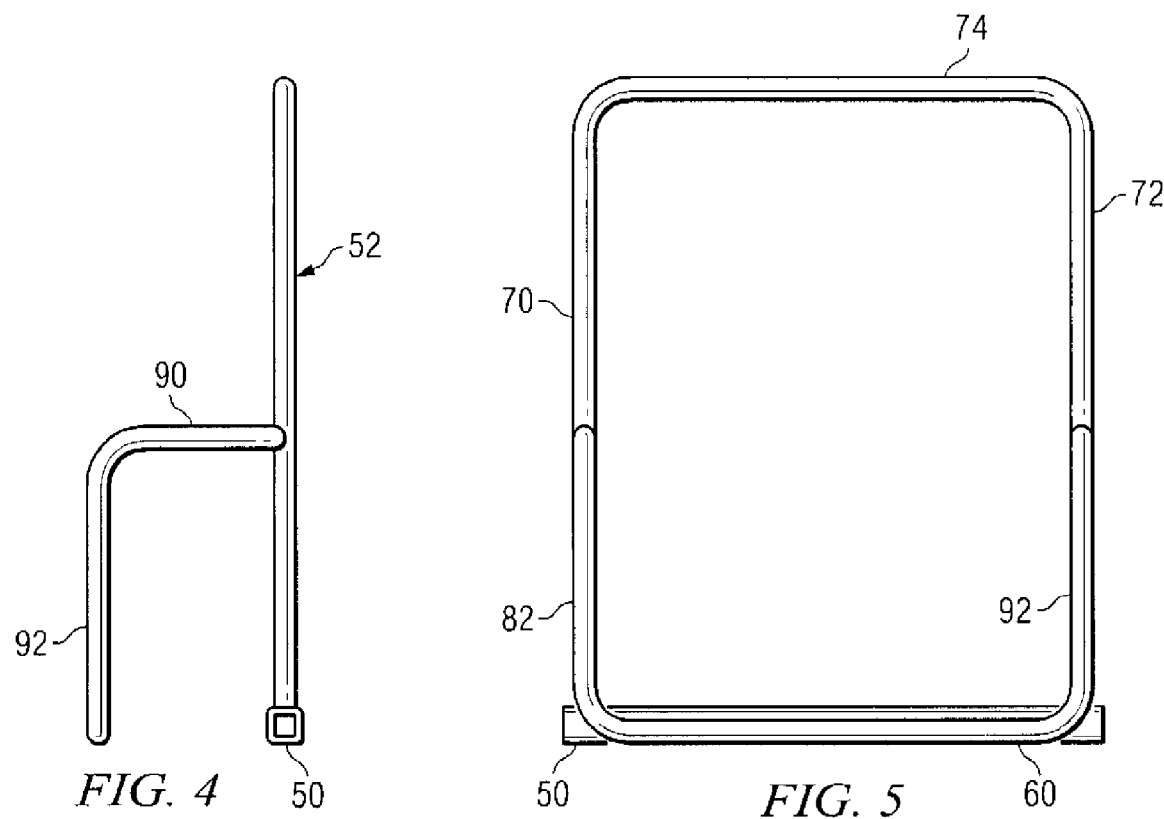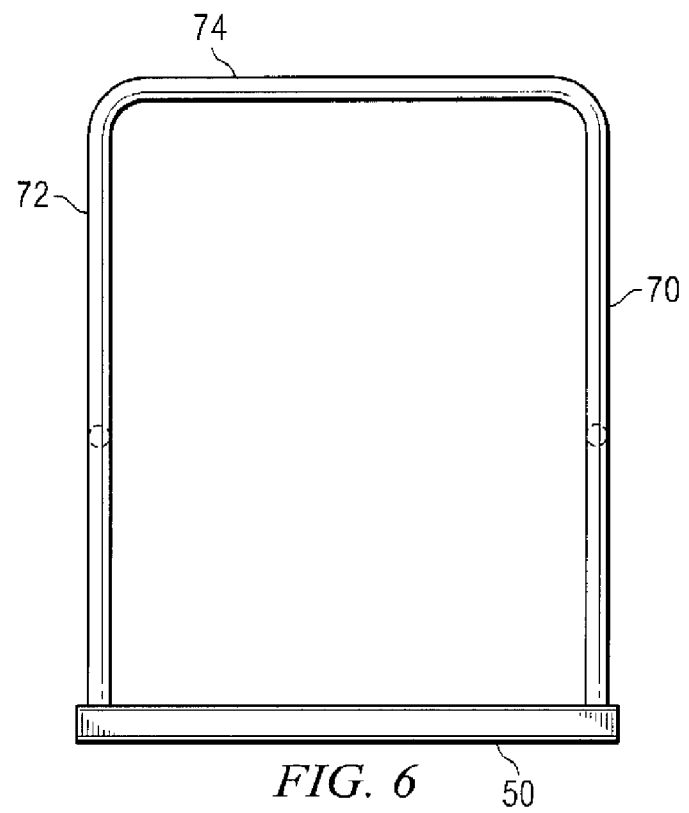

ROLL BAR ASSEMBLY

TECHNICAL FIELD

The present invention is related to roll bar assemblies for use with motor vehicles.

BACKGROUND

Off-road vehicles, such as light utility vehicles, small utility vehicles, and others, are capable of traveling on paved surfaces and off-road terrain that can be uneven. Off-road vehicles typically include one or more roll bars to protect the vehicle passengers in the event the vehicle rolls over as a result of traveling over off-road terrain. A variety of roll bar configurations are known in the art.

SUMMARY

A roll bar assembly is provided that includes a base member configured for mounting on a frame of a vehicle. The roll bar assembly also includes an upper member secured to the base member and an armrest member secured to the upper member. The armrest member includes first and second armrests spaced apart from one another and also includes a connecting portion extending between the first and second armrests. The connecting portion of the armrest member is spaced apart from the base member and the upper member and is configured for mounting on the frame of the vehicle.

According to another embodiment, a roll bar assembly is provided for mounting on a frame of a vehicle, with the frame extending in a longitudinal direction of the vehicle. The roll bar assembly includes a base member configured for mounting to the frame and for extending in a direction transverse to the longitudinal direction of the vehicle. The roll bar assembly also includes an upper member secured to the base member. The upper member is configured for protecting passengers in the event the vehicle rolls over. The roll bar assembly further includes a connecting portion configured for mounting to the frame at a location spaced apart from the base member and the upper member. The connecting portion extends substantially parallel with the base member.

A vehicle is provided that includes a frame and a roll bar assembly mounted on the frame. The roll bar assembly includes a base member, an upper member secured to the base member and an armrest member secured to the upper member. The armrest member includes first and second armrests laterally spaced from one another. The armrest member also includes a connecting portion extending between and interconnecting the first and second armrests. The connecting portion of the armrest member is spaced apart from the base member and the upper member. The base member of the roll bar assembly and the connecting portion of the armrest member are secured to the frame.

BRIEF DESCRIPTION OF THE DRAWINGS

Various embodiments according to the inventive principles will become better understood with regard to the following description, appended claims and accompanying drawings wherein:

FIG. 4 is a side elevation view of the roll bar assembly shown in FIGS. 2 and 3;

FIG. 5 is a front elevation view of the roll bar assembly shown in FIGS. 2-4;

FIG. 6 is a rear elevation view of the roll bar assembly shown in FIGS. 2-5;

DETAILED DESCRIPTION

Figure 1:
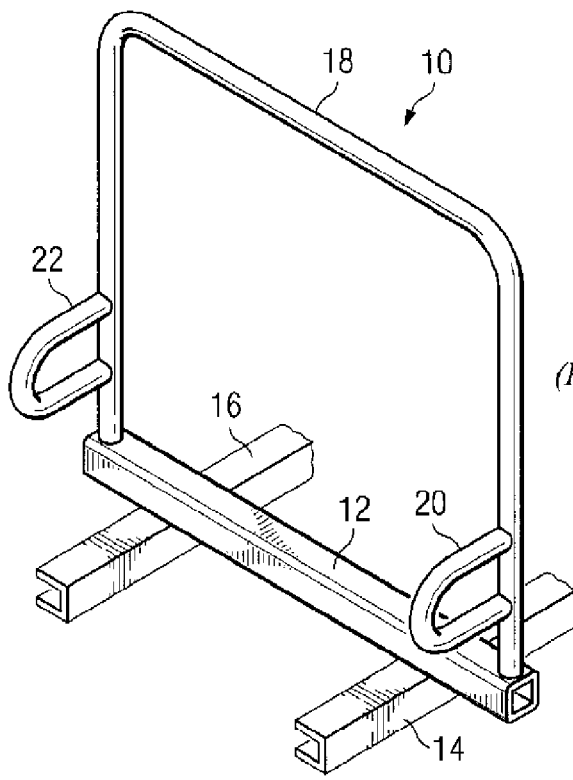
FIG. 1 is a perspective view illustrating a Prior Art roll bar assembly.

Referring to the drawings, wherein like numbers indicate the same or corresponding elements throughout the views, Prior Art FIG. 1 illustrates a conventional roll bar assembly 10. Assembly 10 includes a base member 12 that is secured to longitudinally extending frame members 14, 16 of a vehicle (not shown). As shown in FIG. 1, base member 12 extends transversely to the frame members 14, 16. Assembly 10 also includes a roll bar 18, which has an inverted U-shape and is secured to the base member 12. Assembly 10 also includes first 20 and second 22 armrests that are secured to the roll bar 18.

Figure 2:
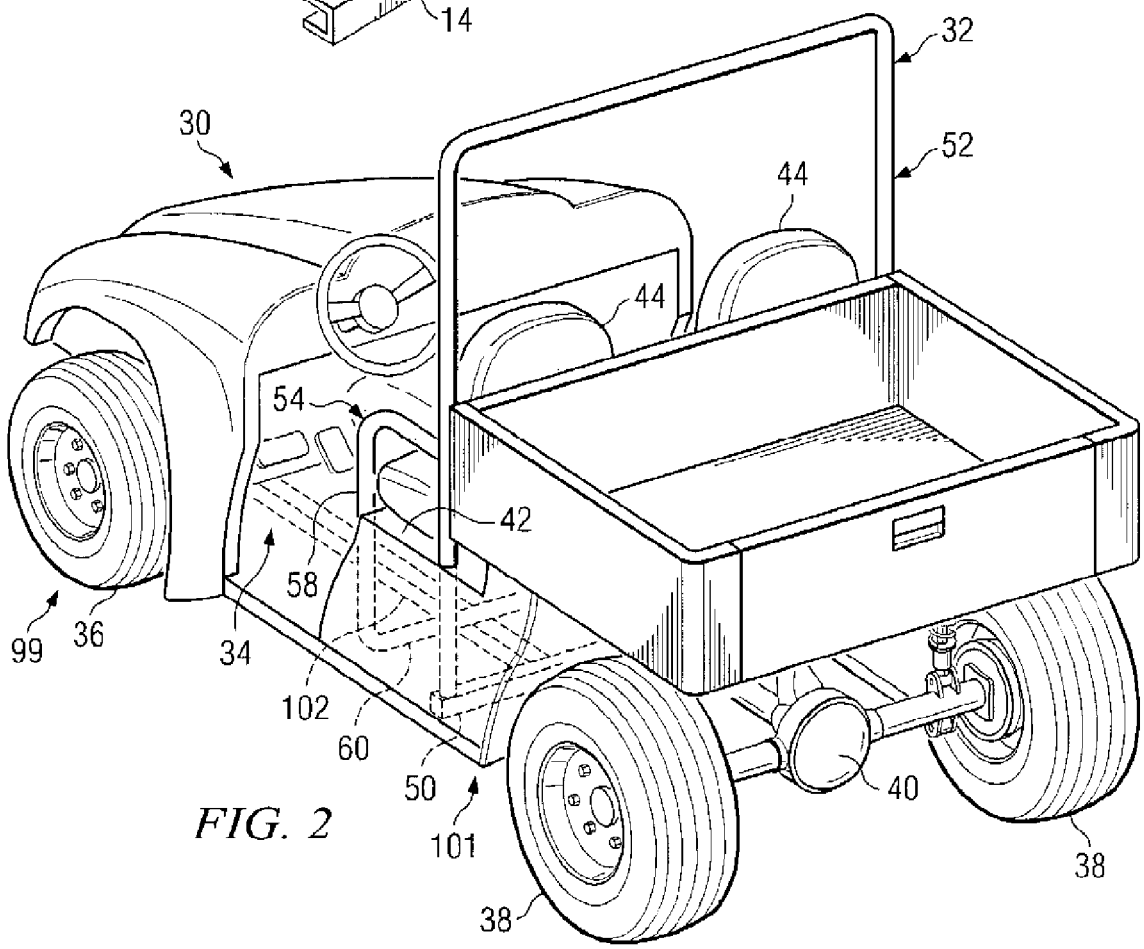
FIG. 2 is a perspective view of a vehicle that can include a roll bar assembly according to one embodiment.
Figure 11:
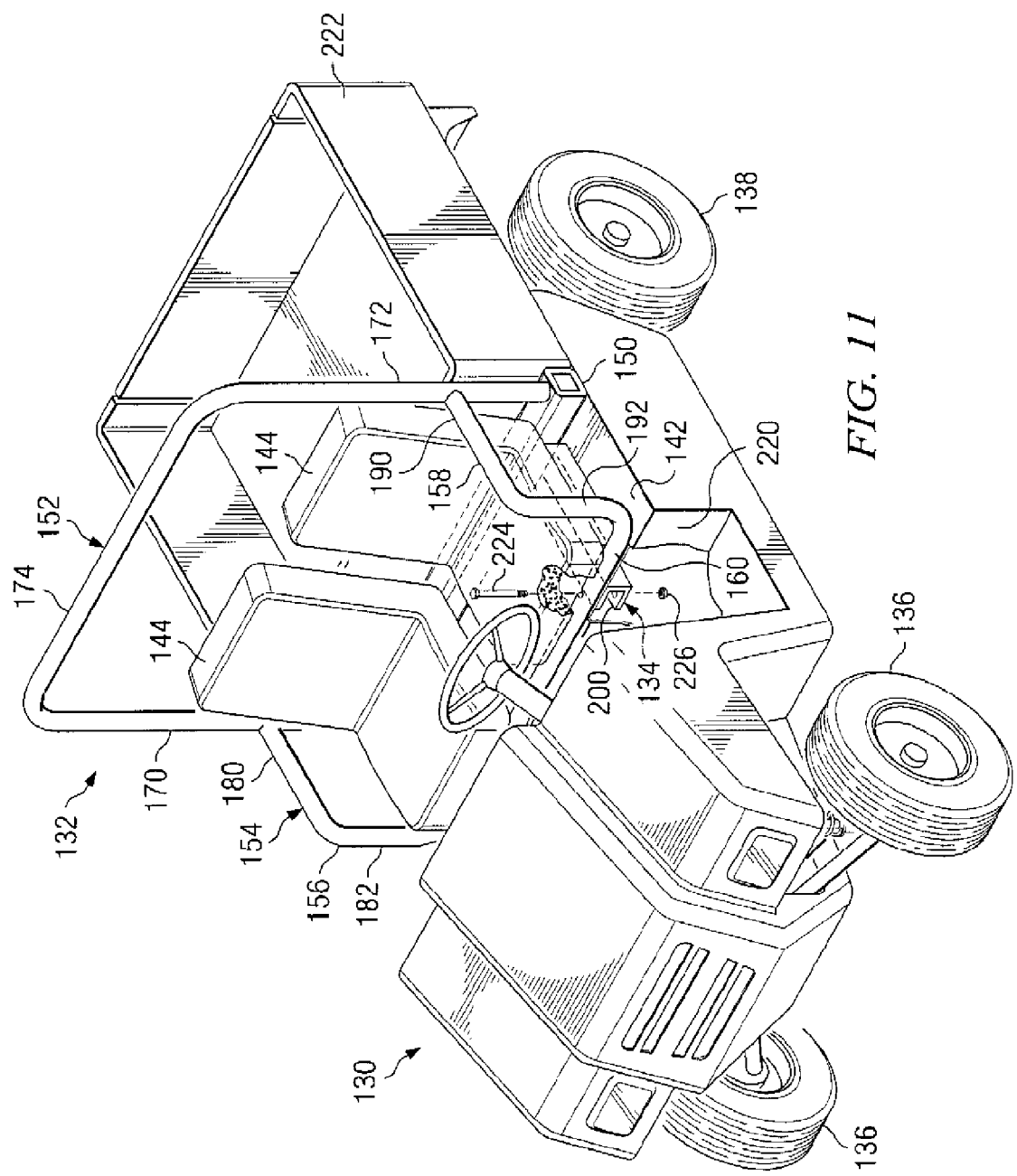
FIG. 11 is a perspective view of a vehicle that can include a roll bar assembly according to another embodiment.
Figure 12:
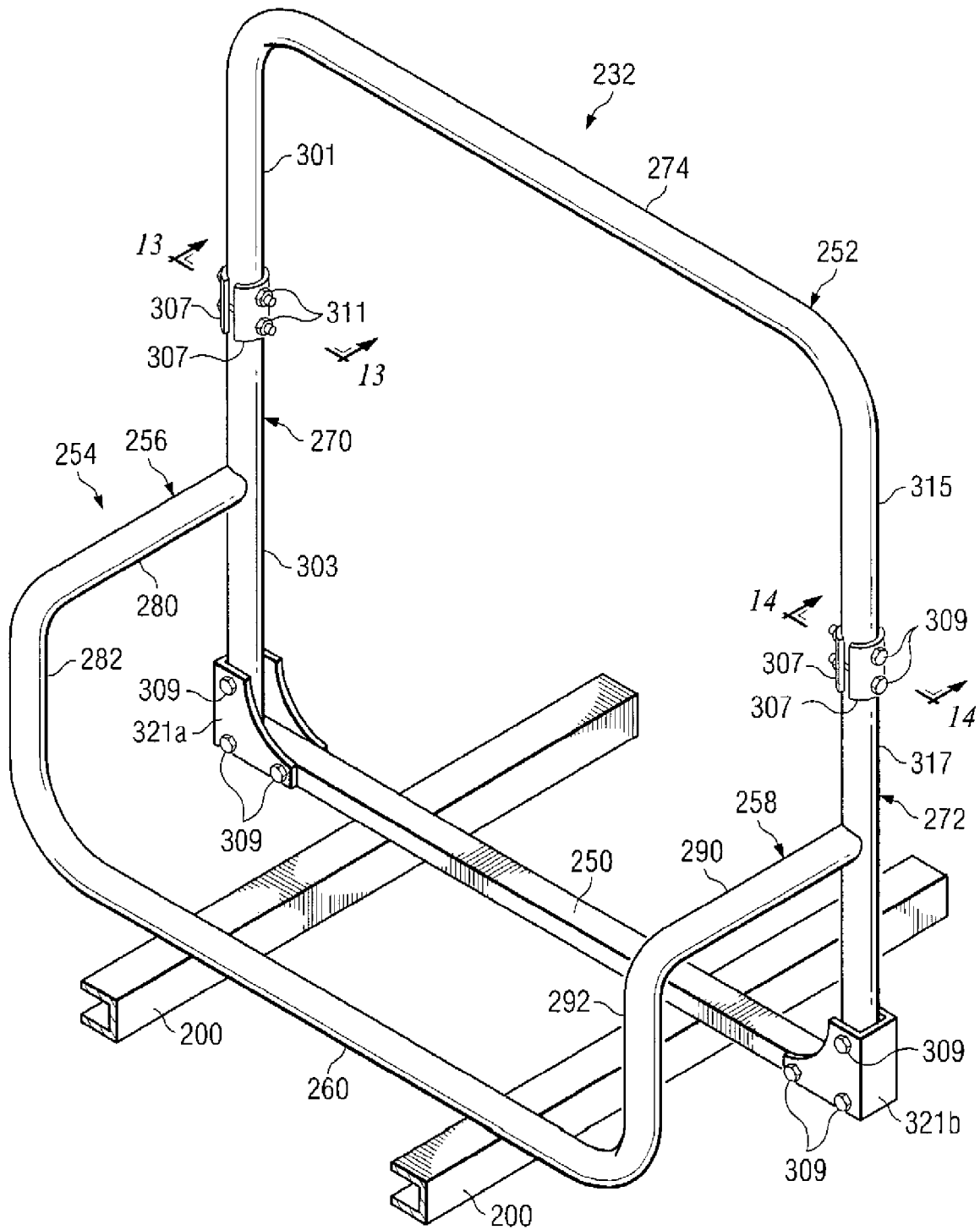
FIG. 12 is a perspective view of a roll bar assembly according to another embodiment.

FIG. 2 illustrates a vehicle 30 that can incorporate a roll bar assembly 32 according to one embodiment and FIG. 11 illustrates a vehicle 130 that can incorporate a roll bar assembly 132 according to another embodiment. FIG. 12 illustrates a roll bar assembly 232 according to another embodiment. The roll bar assemblies 32, 132, 232 can be used on light utility vehicles such as vehicle 30 shown in FIG. 2 and vehicle 130 shown in FIG. 11. The roll bar assemblies 32, 132, 232 can also be used in other types of utility vehicles and can also be used on a variety of other vehicles including golf carts, "dune buggies" and trucks. Referring to FIG. 2, vehicle 30 includes a frame, indicated generally at 34, two front wheels 36 (one shown) and two rear wheels 38. Frame 34 can extend in a longitudinal direction 35 (FIG. 3) of vehicle 30. Wheels 36 and 38 are suspended from the frame 34. Vehicle 30 also includes a source of motive power (not shown), which can be an internal combustion engine, and a drivetrain that can include a rear differential 40 for transferring torque from the source of motive power to the rear wheels 38. The roll bar assembly 32 is secured to the frame 34. Vehicle 30 can also include a raised floor section 42 and a pair of forwardly-facing seats 44.

Figure 3:
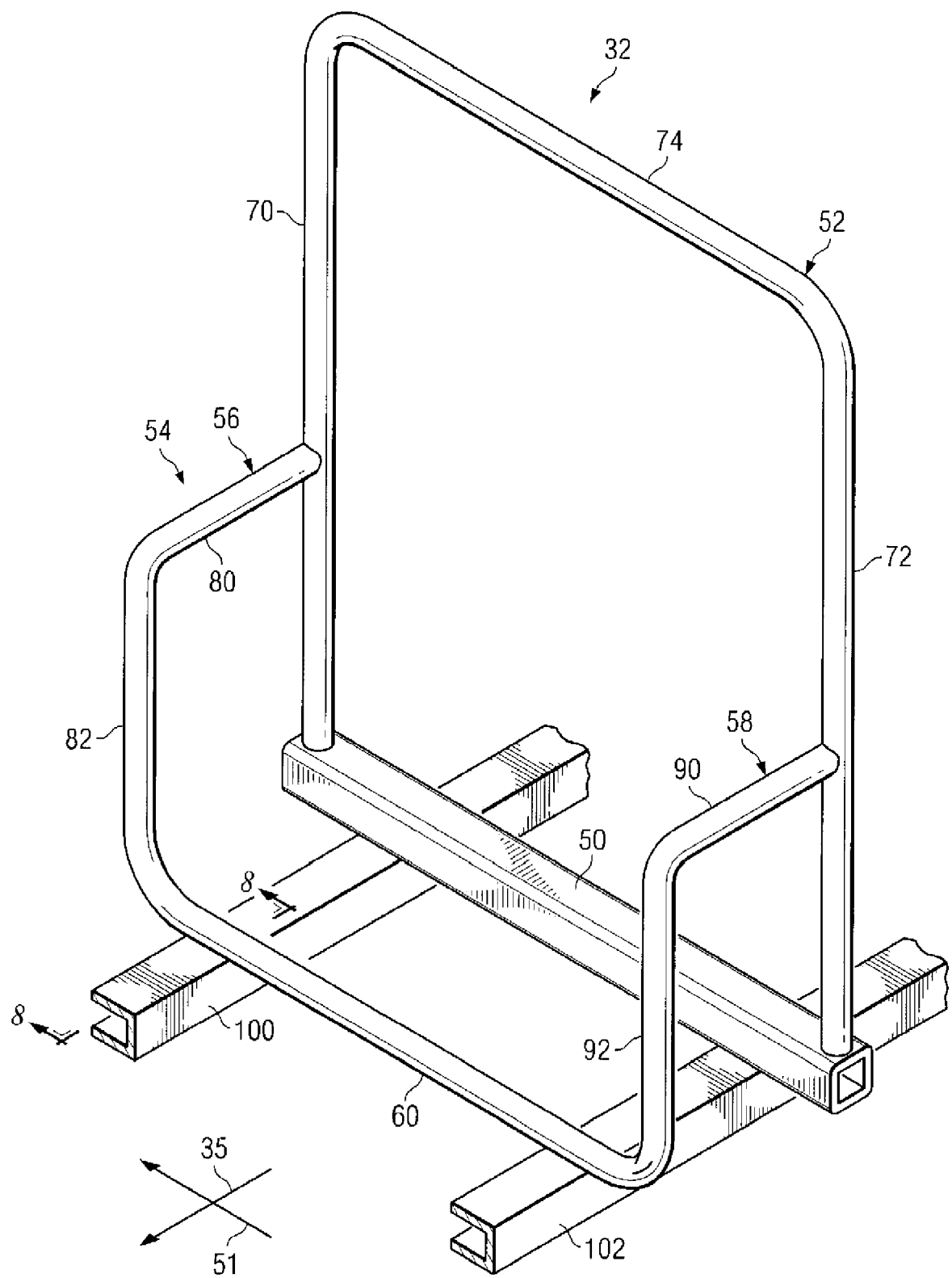
FIG. 3 is a perspective view of the roll bar assembly in association with longitudinally extending frame members as shown in FIG. 2.
Figure 7:
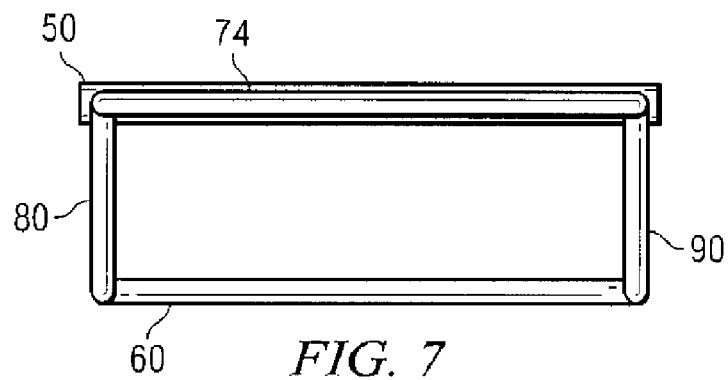
FIG. 7 is a top plan view of the roll bar assembly shown in FIGS. 2-6.

Roll bar assembly 32 includes a base member 50 that is configured for mounting on a vehicle, for example on the frame 34 of vehicle 30. Base member 50 can extend in a direction 51 (FIG. 3) that is transverse to the longitudinal direction 35 of vehicle 30. Roll bar assembly 32 also includes an upper member 52 secured to the base member 50 and an armrest member 54 secured to the upper member 52. The armrest member 54 can include a first armrest 56 and a second armrest 58. The armrest member 54 can further include a connecting portion 60 that extends between and interconnects the first armrest 56 and the second armrest 58. As shown in FIG. 3, the connecting portion 60 of the armrest member 54 is spaced apart from the base member 50 and the upper member 52 of the roll bar assembly 32 and is configured for mounting on the frame 34 of vehicle 30.

When roll bar assembly 32 is mounted on vehicle 30 and oriented as shown in FIG. 3, the connecting portion 60 of armrest member 54 is longitudinally spaced from the base member 50 and the upper member 52 and is forward of members 50, 52. Also, when the roll bar assembly 32 is oriented as shown in FIG. 3, the first armrest 56 is a right armrest and the second armrest 58 is a left armrest, with armrests 56 and 58 being laterally spaced from one another and extending forwardly from the upper member 52. The forwardly extending armrests 56, 58 can accommodate occupants of vehicle 30 seated in the forwardly-facing seats 44. In another embodiment (not shown) the roll bar assembly 32 can be mounted on a vehicle (not shown) having rearwardly-facing seats, so that the first 56 and second 58 armrests extend rearwardly from the upper member 52 and accommodate occupants sitting in the rearwardly-facing seats. In this case, the first 56 and second 58 armrests would be left and right armrests, respectively. For purposes of illustration, roll bar assembly 32 will be described subsequently herein with respect to the orientation of roll bar assembly 32 on vehicle 30 shown in FIG. 3.

In one embodiment, as shown in FIGS. 3-7, the right armrest 56, the left armrest 58 and the connecting portion 60 can be integrally formed as a unitary, or one piece, structure. In other embodiments (not shown), the right armrest 56, the left armrest 58 and the connecting portion 60 can be separately manufactured, with the right armrest 56 and the left armrest 58 secured to the connecting portion 60, for example by welding. In one embodiment, the right armrest 56, the left armrest 58 and the connecting portion 60 can each have a tubular construction. In other embodiments the right armrest 56, the left armrest 58 and the connecting portion 60 can have different constructions, for example each can be made from bar stock or box beams. The right armrest 56, the left armrest 58 and the connecting portion 60 can be made of metal or a metal alloy, for example steel or aluminum, or other materials having comparable or superior mechanical properties. The shape of the right armrest 56 can be the same as the shape of the left armrest 58 or different than the shape of the left armrest 58. The right armrest 56 can be substantially parallel with the left armrest 58 as shown, for example, in FIG. 3. The connecting portion 60 can be substantially parallel with the base member 50 as also shown in FIG. 3.

The upper member 52 of assembly 32 can include a right side portion 70, a left side portion 72 and a top portion 74. The right side portion 70 and left side portion 72 of upper member 52 can be secured to base member 50 and extend upwardly from base member 50, as shown in FIGS. 3-7. The top portion 74 can be positioned above base member 50. A lower end of each of the right 70 and left 72 side portions of upper member 52 can be secured to base member 50, for example by welding or by using other suitable methods. The right 70 and left 72 side portions of upper member 52 can be substantially perpendicular to base member 50, as shown in FIG. 3. The top portion 74 of upper member 52 extends between and interconnects the right 70 and left 72 side portions of upper member 52. The top portion 74 of upper member 52 can be substantially parallel with one or both of the connecting portion 60 of the armrest member 54 and the base member 50 of assembly 32. The right side portion 70, the left side portion 72 and the top portion 74 of upper member 52 can be integrally formed as a unitary, or one piece, structure and each can have a tubular construction. The right side portion 70, the left side portion 72 and the top portion 74 can have other constructions, for example they can be constructed from bar stock or box beams. The right side portion 70, the left side portion 72 and the top portion 74 of upper member 52 can be made of metal or a metal alloy, for example steel or aluminum, or other materials having comparable or superior mechanical properties.

The right armrest 56 of armrest member 54 can include a first portion 80 secured at one end to the right side portion 70 of upper member 52, for example by welding, fastening or other suitable methods. An opposite end of the first portion 80 of the right armrest 56 can be integral with a second portion 82 of the right armrest 56. As shown in FIGS. 3-7, the first portion 80 can extend forwardly from the right side portion 70 of upper member 52 to the second portion 82 of the right armrest 56. The first portion 80 of the right armrest 56 can be substantially perpendicular to the right side portion 70 of the upper member 52. The second portion 82 of the right armrest 56 can be forward of the upper member 52 and extends downwardly from the first portion 80 of the right armrest 56 to the connecting portion 60 of armrest member 54. A lower end of the second portion 82 can be integral with the connecting portion 60. The second portion 82 of the right armrest can be substantially perpendicular to one or both of the first portion 80 of the right armrest 56 and the connecting portion 60 of the armrest member 54 as shown in FIG. 3. The second portion 82 of the right armrest 56 can be substantially parallel with one or both of the right 70 and left 72 side portions of the upper member 52.

The left armrest 58 can include a first portion 90 secured at one end to the left side portion 72 of the upper member 52, for example by welding, fastening or other suitable methods. An opposite end of the first portion 90 of the left armrest 58 can be integral with a second portion 92 of the left armrest 58. As shown in FIGS. 2-4, the first portion 90 can extend forwardly from the left side portion 72 of the upper member 52 to the second portion 92 of the left armrest 58. The first portion 90 of the left armrest 58 can be substantially perpendicular to the left side portion 72 of the upper member 52, as also shown in FIGS. 2-4. The second portion 92 of the left armrest 58 can be forward of the upper member 52 and extends downwardly from the first portion 90 of the left armrest 58 to the connecting portion 60 of the armrest member 54. A lower end of the second portion 92 can be integral with the connecting portion 60. The second portion 92 of the left armrest 58 can be substantially perpendicular to one or both of the first portion 90 of the left armrest 58 and the connecting portion 60 of the armrest member 54, as shown in FIG. 3. The second portion 92 of the left armrest 58 can be substantially parallel with one or both of the right 70 and left 72 side portions of the upper member 52, as shown in FIG. 5.

As shown in FIG. 3, the frame 34 of vehicle 30 can include two longitudinally extending members 100, 102 and the base member 50 and the connecting portion 60 of the armrest member 54 can extend transversely to one or both of the longitudinally extending members 100, 102. The length and longitudinal location of the longitudinally extending members 100, 102 can vary with application. For example, as shown in FIG. 2 with respect to member 102, the longitudinally extending members 100, 102 can extend continuously from a location at the forward end of vehicle 30, indicated generally at 99 in FIG. 2, to a location proximate the rear end of vehicle 30, indicated generally at 101 in FIG. 2. Each of the longitudinally extending members 100, 102 can be horizontally disposed so that they extend between locations 99 and 101 with substantially no change in vertical elevation. Longitudinally extending members of a vehicle frame according to other embodiments, can extend between other longitudinal locations on the vehicle, for example as shown in FIG. 11 for the longitudinally extending members 200 of vehicle 130.

The longitudinally extending members 100, 102 can be substantially parallel with one another as shown in FIG. 3, or they can be angled relative to one another. The longitudinally extending members 100, 102 can have various cross-sectional configurations. For example, as shown in FIG. 3, the longitudinally extending members 100, 102 can be C-channels, having generally C-shaped cross-sections. In other embodiments (not shown), the longitudinally extending members 100, 102 can be box beams having either generally square or generally rectangular cross-sectional shapes. In another embodiment (not shown), the longitudinally extending members 100, 102 can have a generally round cross-sectional shape. The longitudinally extending members 100, 102 can have the same or different cross-sectional shapes.

Figure 8:
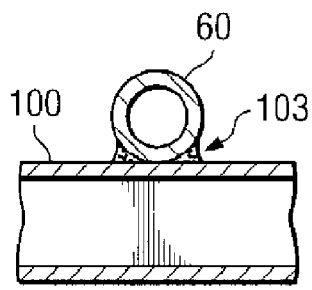
FIG. 8 is a cross-sectional view taken along line 8-8 in FIG. 3, illustrating one method of securing the roll bar assembly shown in FIGS. 2-7 to the frame of the vehicle shown in FIG. 2.
Figure 9:
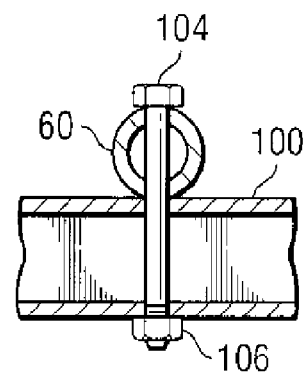
FIG. 9 is a cross-sectional view similar to FIG. 8, illustrating another method of securing the roll bar assembly to the vehicle frame.

In one embodiment, the base member 50 and the connecting portion 60 can be substantially perpendicular to one or both of the longitudinally extending members 100, 102. One or both of the connecting portion 60 and the base member 52 can be secured to one or both of the longitudinally extending members 100, 102, either directly or indirectly. Various methods can be used to secure the base member 50 and the connecting portion 60 to the longitudinally extending members 100, 102 of frame 34. For example, the base member 50 and the connecting portion 60 can be welded directly to the longitudinally extending members 100, 102 as shown in FIG. 8 with respect to the connecting portion 60 and the longitudinally extending member 100 that are welded together as indicated generally at 103. In another embodiment, the vehicle 30 can include a plurality of conventional fasteners such as bolts 104 and nuts 106 that can be used to fasten the base member 50 and the connecting portion 60 to the longitudinally extending members 100, 102 as shown in FIG. 9 with respect to the connecting portion 60 and the longitudinally extending member 100.

Figure 10:
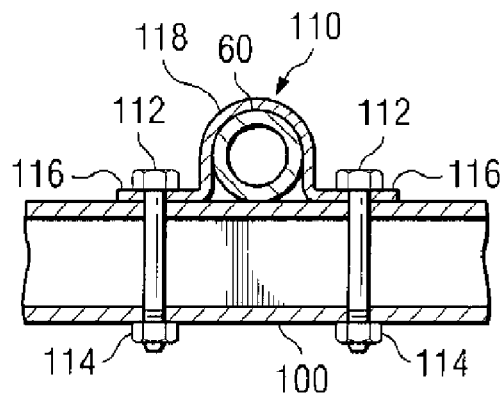
FIG. 10 is a cross-sectional view similar to FIGS. 8 and 9, illustrating another method of securing the roll bar assembly to the vehicle frame.

In another embodiment, the base member 50 and the connecting portion 60 can be clamped to the longitudinally extending members 100, 102 using brackets. For example, the vehicle 30 can include a plurality of brackets 110 (one shown in FIG. 10) and the connecting portion 60 can be clamped to each of the longitudinally extending members 100, 102 using one of the brackets 110 and conventional fasteners such as bolts 112 and nuts 114. As shown in FIG. 10, each bracket 110 can include a pair of flanges 116 and a central portion 118 that extends between the flanges 116. The flanges 116 can be configured to engage the longitudinally extending members 100, 102 and the central portion 118 can be configured to engage the connecting portion 60. The central portion 118 can surround a substantial portion of the outer surface of the connecting portion 60 at the location where the central portion 118 engages the connecting portion 60 as shown in FIG. 10. The flanges 116 of brackets 110, the connecting portion 60 of the armrest member 54 and the longitudinally extending members 100, 102 can include mating apertures to receive the bolts 112, which can be secured with nuts 114 so that the brackets 110 clamp the connecting portion 60 against the respective one of the longitudinally extending members 100, 102.

It may be appreciated that brackets having different configurations than brackets 110 can be used to secure the connecting portion 60 of the armrest member 54 to the longitudinally extending members 100, 102. It may also be appreciated that base member 50 can be secured to the longitudinally extending members 100, 102 using brackets having different configurations than brackets 110. Additionally, one or both of the connecting portion 60 and the base member 50 can be secured to portions of frame 34 other than the longitudinally extending members 100, 102. In one embodiment, one or both of the base member 50 and the connecting portion 60 can be secured indirectly to one or both of the longitudinally extending members 100, 102, for example by positioning shims, spacers or brackets, or a combination thereof, between one or both of the base member 50 and connecting portion 60 and one or both of the longitudinally extending members 100, 102.

The particular length of roll bar assembly components can vary with the requirements of a particular application. FIG. 11 illustrates a vehicle 130 that can incorporate a roll bar assembly 132 according to another embodiment. Roll bar assembly 132 can be the same as roll bar assembly 32 except for the ratio of the lengths of various components, which results in a somewhat different configuration as subsequently described. Roll bar assembly 132 includes a base member 150 that is configured for mounting to a vehicle, for example vehicle 130. Roll bar assembly 132 also includes an upper member 152 secured to the base member 150 and an armrest member 154 secured to the upper member 152. The armrest member 154 can include a first armrest 156 and a second armrest 158. The armrest member 154 can further include a connecting portion 160 that extends between and interconnects the first armrest 156 and the second armrest 158. As shown in FIG. 11, the connecting portion 160 is spaced apart from the base member 150 and the upper member 152 and is configured for mounting to a frame 134 of vehicle 130. The first armrest 156, the second armrest 158 and the connecting portion 160 can be integrally formed as a unitary, or one piece, structure. In other embodiments, the first armrest 156, the second armrest 158 and the connecting portion 160 can be separately manufactured, with the first armrest 156 and the second armrest 158 secured to the connecting portion 160, for example by welding. The roll bar assembly 132 can be made of the same materials, and can have a tubular construction or other type of construction as described for roll bar assembly 32.

The upper member 152 can include a right side portion 170, a left side portion 172 and a top portion 174 extending between and integral with the right 170 and left 172 side portions. The right side portion 170 and the left side portion 172 can be secured to base member 150 and extend upwardly from the base member 150. The upper member 152 can be made as a unitary, or one piece structure, and can have a tubular construction.

The first armrest 156, which can be a right armrest as shown in FIG. 11, can include a first portion 180 secured to and extending forwardly from the right side portion 170 of the upper member 152 and integral with a second portion 182 of the first armrest 156. The second portion 182 can extend downwardly from the first portion 180 to the connecting portion 160. Similarly, the second armrest 158, which can be a left armrest, can include a first portion 190 secured to and extending forwardly from the left side portion 172 of the upper member 152 and integral with a second portion 192 of the left armrest 158. The second portion 192 can extend downwardly from the first portion 190 to the connecting portion 160.

Vehicle 130 has two front wheels 136, two rear wheels 138 (one shown in FIG. 11) and can include a raised floor section 142 and a pair of forwardly-facing seats 144 positioned on top of the raised floor section 142. The armrests 156, 158 can be positioned adjacent the respective one of seats 144 so that the forwardly extending armrests 156 and 158 can accommodate occupants of vehicle 130 sitting in the forwardly-facing seats 144. Vehicle 130 has a frame that can include a pair of laterally spaced longitudinally extending members 200 (one shown in FIG. 11) that can extend rearwardly from a generally central portion of vehicle 130 corresponding to a forward end 220 of the raised floor section 142. The longitudinally extending members 200 can extend rearwardly to a location proximate the rear tires 138 of vehicle 130 or they can extend farther rearward such that they extend substantially entirely or entirely under the longitudinal length of vehicle bed 222.

The longitudinally extending members 200 can be C-channels having a generally C-shaped cross-section or they can have other configurations (not shown). For example the longitudinally extending members 200 can be box beams having either a generally square or a generally rectangular shaped cross-section. In another embodiment, the longitudinally extending members 200 can have a generally round cross-sectional shape. As shown in FIG. 11 with respect to the connecting portion 160 and one of the longitudinally extending members 200, both the base member 150 and the connecting portion 160 of the armrest member 154 can be indirectly secured to one or both of the longitudinally extending members 200, for example by conventional fasteners such as bolts 224 (one shown in FIG. 11) that pass through mating apertures in the connecting portion 160, the raised floor section 142 and at least partially through the longitudinally extending members 200. The bolts 224 can be secured by conventional fasteners such as nuts 226 (one shown in FIG. 11). In other embodiments (not shown), the base member 150 and the connecting portion 160 can be secured directly to one or both of the longitudinally extending members 200 by welding, by using fasteners or fasteners in combination with brackets, for example.

As may be appreciated by comparing FIGS. 11 and 3, a ratio of the second portion 182 to the first portion 180 of the right armrest 156 of the roll bar assembly 132 is less than a ratio of the second portion 82 to the first portion 80 of the right armrest member 56 of the roll bar assembly 32. Similarly a ratio of the length of the second portion 192 to the first portion 190 of the left armrest 158 of armrest member 154 of roll bar assembly 132 is less than a ratio of the second portion 92 to the first portion 90 of the left armrest 58 of the armrest member 54 of the roll bar assembly 32. The previously described ratios of roll bar assemblies 32 and 132 can vary depending upon the particular application.

FIG. 12 illustrates a roll bar assembly 232 according to another embodiment. Roll bar assembly 232 can be used on vehicle 130 in lieu of roll bar assembly 132 and can also be used on other vehicles such as those discussed previously with respect to roll bar assemblies 32, 132. Roll bar assembly 232 can include multiple components that are separable as subsequently discussed, which can facilitate convenient and efficient manufacturing and shipping of roll bar assembly 232.

Roll bar assembly 232 includes a base member 250 that is configured for mounting to a vehicle, for example vehicle 130. Roll bar assembly 232 also includes an upper member 252 secured to the base member 250 and an armrest member 254 secured to the upper member 252. The armrest member 254 can include a first armrest 256 and a second armrest 258. The armrest member 254 can further include a connecting portion 260 that extends between and interconnects the first armrest 256 and the second armrest 258. As shown in FIG. 12, the connecting portion 260 is spaced apart from the base member 250 and the upper member 252 and is configured for mounting to the frame 134 of vehicle 130, for example to the longitudinally extending members 200 of frame 134. The first armrest 256, the second armrest 258 and the connecting portion 260 can be integrally formed as a unitary, or one piece, structure. In other embodiments (not shown), the first armrest 256, the second armrest 258 and the connecting portion 260 can be separately manufactured, with the first armrest 256 and the second armrest 258 secured to the connecting portion 260, for example by welding. In other embodiments (not shown), one or more of the first armrest 256, the second armrest 258 and the connecting 260 can be made as a multi-piece structure, with the individual pieces joined using brackets or other suitable means. The roll bar assembly 232 can be made of the same materials, and can have a tubular construction or other type of construction as described above for roll bar assembly 32.

Figure 13:
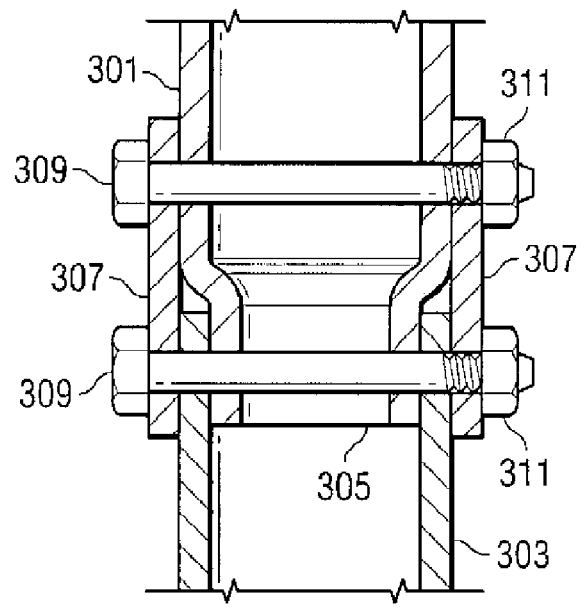
FIG. 13 is a cross-sectional view taken along line 13-13 in FIG. 12.
Figure 14:
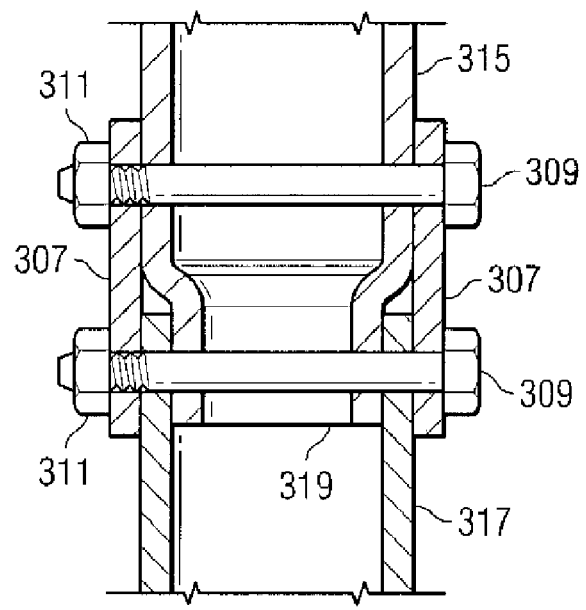
FIG. 14 is a cross-sectional view taken along line 14-14 in FIG. 12.

The upper member 252 can include a right side portion 270, a left side portion 272 and a top portion 274 extending between and integral with the right 270 and left 272 side portions. The right side portion 270 and the left side portion 272 can be secured to base member 250 and extend upwardly from the base member 250. The upper member 252 can be made as a multi-piece structure as shown in FIGS. 12-14, or as a unitary structure. As shown in FIG. 12, the upper member 252 and the armrest member 254 can have a tubular construction. In other embodiments (not shown), one or both of the upper member 252 and the armrest member 254 can have a different construction. For example one or both of the upper member 252 and the armrest member 254 can be made from bar stock or box beams.

The first armrest 256, which can be a right armrest as shown in FIG. 12, can include a first portion 280 secured to and extending forwardly from the right side portion 270 of the upper member 252 and integral with a second portion 282 of the first armrest 256. The second portion 282 can extend downwardly from the first portion 280 to the connecting portion 260. Similarly, the second armrest 258, which can be a left armrest, can include a first portion 290 secured to and extending forwardly from the left side portion 272 of the upper member 252 and integral with a second portion 292 of the left armrest 258. The second portion 292 can extend downwardly from the first portion 290 to the connecting portion 260.

The right side portion 270 of upper member 252 can include an upper right side portion 301 and a lower right side portion 303 that are separable from one another and that can be telescopically engaged with one another. A lower end 305 of the upper right side portion 301 can have a reduced size, for example a reduced outside diameter if the upper right side portion 301 is made from circular tubing, relative to the remainder of the upper right side portion 301 and can be sized to telescope within the lower right side portion 303 as shown in FIG. 13. A pair of brackets 307 can be used, with conventional fasteners such as bolts 309 and nuts 311, to releasably secure the upper right side portion 301 to the lower right side portion 303 as shown in FIG. 13. In another embodiment (not shown), a cylindrical sleeve can be used, in lieu of brackets 307, with fasteners 309, 311 to secure the upper right side portion 301 to the lower right side portion 303. In another embodiment (not shown), the lower right side portion 303 can have a reduced size upper end that can telescope within the upper right side portion 301. In another embodiment (not shown), the lower end 305 of the upper right side portion 301 can have the same outside diameter as the remainder of the upper right side portion 301 and the same outside diameter as the lower right side portion 303 of the right side portion 270. In this embodiment, the lower end 305 of the upper right side portion 301 can abut the lower right side portion 303 and the upper 301 and lower 303 right side portions can be secured to one another with brackets 307, bolts 309 and nuts 311 as described previously.

Similarly, the left side portion 272 of upper member 252 can include an upper left side portion 315 and a lower left side portion 317 that are separable from one another and that can be telescopically engaged with one another. For example, the upper left side portion 315 can have a reduced size lower end 319 that can telescope within the lower left side portion 317, with the upper 315 and lower 317 left side portions being releasably secured to one another with a second pair of brackets 307 and conventional fasteners such as bolts 309 and nuts 311, as shown in FIG. 14. In another embodiment (not shown), a cylindrical sleeve can be used, in lieu of brackets 307, with fasteners 309, 311 to secure the upper left side portion 315 to the lower left side portion 317. In another embodiment (not shown), the lower left side portion 317 can have a reduced size upper end that can telescope within the upper left side portion 315. In another embodiment, the upper 315 and lower 317 left side portions can have the same or substantially the same cross-sectional size and can abut one another. In this embodiment, the upper 315 and lower 317 left side portions can also be secured to one another with brackets 307, bolts 309 and nuts 311.

The base member 250 can be releasably secured to the right side portion 270 and the left side portion 272 of upper member 252 using a pair of brackets 321a and 321b as shown in FIG. 12. Bracket 321a can be releasably secured to both the right side portion 270 and the base member 250 of the upper member 252 using conventional fasteners such as bolts 309 and nuts (not shown). Similarly, bracket 321b can be releasably secured to both the base member 250 and the left side portion 272 of the upper member 252 using conventional fasteners such as bolts 309 and nuts (not shown).

The multi-piece construction of the left 270 and right 272 side portions of the upper member 252, as well as the use of brackets 321a and 321b to secure the base member 250 to the right side portion 270 and the left side portion 272 of upper member 252, can facilitate the convenient and efficient manufacture and shipment of the roll bar assembly 232. The manufacture and shipment of roll bar assembly 232 can be further facilitated by manufacturing one or more of the following as multi-piece structures: base member 250; the top portion 274 of upper member 252; the armrests 256, 258 of armrest member 254; and the connecting portion 260 of armrest member 254.

Referring to FIGS. 2-10, securing the base member 50 and the connecting portion 60 of the armrest member 54 of the roll bar assembly 32 to the longitudinally extending members 100, 102 of frame 34 of vehicle 30, in combination with the configuration of the roll bar assembly 32 including the longitudinal spacing between the base member 50 and the connecting portion 60 of the armrest member 54, enhances the stiffness of the roll bar assembly 32 in a forward-to-rear direction relative to the corresponding stiffness of the conventional roll bar assembly 10. This enhanced stiffness provides enhanced protection for the occupants of vehicle 30 in the event vehicle 30 rolls over due to travel over rough or uneven off-road terrain. Likewise, referring to FIG. 11, securing the base member 150 and the connecting portion 160 of the armrest member 154 of the roll bar assembly 132 to the longitudinally extending members 200 of the frame 134 of vehicle 130, in combination with the configuration of the roll bar assembly 132, including the longitudinal spacing between the base member 150 and the connecting portion 160 of the armrest member 154, enhances the stiffness of the roll bar assembly 132 in a forward-to-rear direction relative to the corresponding stiffness of the conventional roll bar assembly 10. Similarly, referring to FIGS. 12-14, securing the base member 250 and the connecting portion 260 of the armrest member 254 of the roll bar assembly 232 to longitudinally extending members of a vehicle frame, for example the longitudinally extending members 200 of the frame 134 of vehicle 130, in combination with the configuration of roll bar assembly 232, including the longitudinal spacing between base member 250 and the connecting portion 260 of the armrest member 254, enhances the stiffness of the roll bar assembly 232 in a forward-to-rear direction relative to the corresponding stiffness of the conventional roll bar assembly 10.

The upper members 52, 152 and 252, of roll bar assemblies 32, 132 and 232, respectively, are configured for protecting passengers in the vehicle in which they are used, for example vehicles 30 and 130, in the event the respective vehicle rolls over.

While the inventive principles have been illustrated by the description of various embodiments thereof, and while the embodiments have been described in considerable detail, it is not intended to restrict or in anyway limit the scope of the appended claims to such detail. Additional advantages and modifications will be readily apparent to those skilled in the art. The invention in its broader aspects is therefore not limited to the specific details, representative apparatus and methods and illustrative examples shown and described. Accordingly, departures may be made from such details without departing from the scope and spirit of the general inventive principles.

What is claimed:

1. A roll bar assembly comprising:
    a base member configured for mounting on a frame of a vehicle;
    an upper member secured to the base member, the upper member comprising a left side portion, a right side portion and a top portion extending between and interconnecting the left side portion and the right side portion; and
    an armrest member secured to the upper member, the armrest member comprising first and second armrests spaced apart from one another, the armrest member further comprising a connecting portion extending between and interconnecting the first and second armrests; wherein
    each of the left side portion and the right side portion of the upper member is secured to the base member and is substantially perpendicular to the base member;
    the connecting portion of the armrest member is spaced apart from the base member and the upper member and is configured for mounting on a frame of a vehicle;
    the first and second armrests each comprise first and second portions that are integral with one another;
    each of the first portion of the first armrest and the first portion of the second armrest is secured to the upper member; and
    each of the second portion of the first armrest and the second portion of the second armrest is integral with the connecting portion.

2. The roll bar assembly of claim 1, wherein:
    the first and second armrests and the connecting portion of the armrest member are integrally formed as a unitary structure.

3. The roll bar assembly of claim 1, wherein:
the first armrest has a first shape and the second armrest has a second shape; and
the first shape is the same as the second shape.

4. The roll bar assembly of claim 3, wherein:
the first armrest is substantially parallel with the second armrest.

5. The roll bar assembly of claim 4, wherein:
the connecting portion is substantially parallel with the base member.

6. A roll bar assembly comprising:
a base member configured for mounting on a frame of a vehicle;
an upper member secured to the base member; and
an armrest member secured to the upper member, the armrest member comprising first and second armrests spaced apart from one another, the armrest member further comprising a connecting portion extending between and interconnecting the first and second armrests; wherein
the connecting portion of the armrest member is spaced apart from the base member and the upper member and is configured for mounting on a frame of a vehicle;
the first and second armrests each comprise first and second portions that are integral with one another;
the first portion of the first armrest is substantially perpendicular to the second portion of the first armrest;
the first portion of the second armrest is substantially perpendicular to the second portion of the second armrest; and
the first and second armrests and the connecting portion of the armrest member are integrally formed as a unitary structure.

7. A vehicle comprising:
a frame; and
a roll bar assembly mounted on the frame, the roll bar assembly comprising a base member, an upper member secured to the base member and an armrest member secured to the upper member; wherein
the armrest member comprises first and second armrests laterally spaced from one another, the armrest member further comprising a connecting portion extending between and interconnecting the first and second armrests;
the connecting portion of the armrest member is spaced apart from the base member and the upper member; and
the base member of the roll bar assembly and the connecting portion of the armrest member are secured to the frame.

8. The vehicle of claim 7, wherein:
the frame comprises at least one longitudinally extending member; and
the base member and the connecting portion of the armrest member extend transversely to the at least one longitudinally extending member and are secured directly to the at least one longitudinally extending member.

9. The vehicle of claim 7, wherein:
the first armrest is a left armrest and the second armrest is a right armrest; and
the left armrest, the right armrest and the connecting portion of the armrest member are integrally formed as a unitary structure.

10. The vehicle of claim 9, wherein:
the armrest member comprises a tubular construction;
the left and right armrests each comprise first and second portions that are integral with one another;
each of the first portion of the left armrest and the first portion of the right armrest is secured to the upper member; and
each of the second portion of the left armrest and the second portion of the right armrest is integral with the connecting portion.

11. The vehicle of claim 7, wherein:
the first armrest has a first shape and the second armrest has a second shape; and
the first shape is the same as the second shape.

12. The vehicle of claim 11, wherein:
the first armrest is substantially parallel with the second armrest.

13. The vehicle of claim 7, wherein:
the first armrest is a left armrest and the second armrest is a right armrest;
each of the left and right armrests comprises first and second portions that are integral with one another;
the upper member comprises a left side portion, a right side portion and a top portion, each of the left side portion and the right side portion being secured to the base member and extending upwardly from the base member, the top portion extending between and interconnecting the left and right side portions of the upper member; and
the top portion of the upper member is substantially parallel with each of the base member and the connecting portion of the armrest member.

14. The vehicle of claim 13, wherein:
the first portion of the left armrest is substantially perpendicular to the left side portion of the upper member and the first portion of the right armrest is substantially perpendicular to the right side portion of the upper member;
the second portion of the left armrest is substantially perpendicular to each of the first portion of the left armrest and the connecting portion and is substantially parallel with each of the left and right side portions of the upper member; and
the second portion of the right armrest is substantially perpendicular to each of the first portion of the right armrest and the connecting portion and is substantially parallel with each of the left and right side portions of the upper member.

15. A vehicle comprising:
a frame; and
a roll bar assembly mounted on the frame, the roll bar assembly comprising a base member, an upper member secured to the base member and an armrest member secured to the upper member; wherein
the armrest member comprises first and second armrests laterally spaced from one another, the armrest member further comprising a connecting portion extending between and interconnecting the first and second armrests;
the connecting portion of the armrest member is spaced apart from the base member and the upper member;
the base member of the roll bar assembly and the connecting portion of the armrest member are secured to the frame;
the frame comprises two longitudinally extending members;
the connecting portion of the armrest member extends transversely to both of the longitudinally extending members and is secured to both of the longitudinally extending members; and
the base member extends transversely to both of the longitudinally extending members and is secured to both of the longitudinally extending members.

16. The vehicle of claim 15, wherein:
the connecting portion of the armrest member and the base member are secured directly to both of the longitudinally extending members.

17. The vehicle of claim 15, wherein:
the connecting portion of the armrest member is welded to at least one of the longitudinally extending members of the frame.

18. The vehicle of claim 15, wherein:
the connecting portion of the armrest member is fastened to at least one of the longitudinally extending members of the frame.

19. The vehicle of claim 15, wherein:
the connecting portion of the armrest member is clamped to at least one of the longitudinally extending members of the frame.

20. A vehicle comprising:
a frame; and
a roll bar assembly mounted on the frame, the roll bar assembly comprising a base member, an upper member secured to the base member and an armrest member secured to the upper member; wherein
the armrest member comprises first and second armrests laterally spaced from one another, the armrest member further comprising a connecting portion extending between and interconnecting the first and second armrests;
the connecting portion of the armrest member is spaced apart from the base member and the upper member;
the base member of the roll bar assembly and the connecting portion of the armrest member are secured to the frame;
each of the armrests comprises a first portion secured to the upper member and extending forwardly from the upper member, each of the armrests further comprising a second portion integral with the first portion of the respective armrest and integral with the connecting portion of the armrest member;
the second portion of each of the armrests is forward of the upper member and extends downwardly from the first portion of the respective armrest to the connecting portion of the armrest member; and
the connecting portion of the armrest member is positioned forward of the upper member.

21. The vehicle of claim 20, wherein:
the upper member comprises left and right side portions secured to and extending upwardly from the base member;
the upper member further comprises a top portion positioned above the base member; and
the top portion extends between and interconnects the left and right side portions.

22. The vehicle of claim 21, wherein:
the first armrest is a left armrest and the second armrest is a right armrest;
the first portion of the left armrest is secured to, and substantially perpendicular to, the left side portion of the upper member;
the second portion of the left armrest is substantially parallel with the left side portion of the upper member;
the first portion of the right armrest is secured to, and substantially perpendicular to, the right side portion of the upper member; and
the second portion of the right armrest is substantially parallel with the right side portion of the upper member.

23. The vehicle of claim 21, wherein:
the top portion of the upper member is substantially parallel with the base member and is substantially parallel with the connecting portion of the armrest member.

24. The vehicle of claim 20, wherein:
the upper member comprises left and right side portions secured to and extending upwardly from the base member;
the left side portion of the upper member comprises an upper left side portion and a lower left side portion telescopically engaged with one another; and
the right side portion of the upper member comprises an upper right side portion and a lower right side portion telescopically engaged with one another.

25. The vehicle of claim 24, wherein:
the upper member further comprises a top portion extending between and integral with the upper left side portion and the upper right side portion of the upper member;
the roll bar assembly further comprises first and second pairs of brackets;
the first pair of brackets are fastened to the upper left side portion and the lower left side portion of the upper member; and
the second pair of brackets are fastened to the upper right side portion and the lower right side portion of the upper member.

26. The vehicle of claim 25, wherein:
the roll bar assembly further comprises a third pair of brackets;
a first one of the third pair of brackets is fastened to the base member and the lower left side portion of the upper member; and
a second one of the third pair of brackets is fastened to the base member and the lower right side portion of the upper member.

27. A roll bar assembly for mounting on a frame of a vehicle, the frame extending in a longitudinal direction of the vehicle, the roll bar assembly comprising:
a base member configured for mounting to the frame and for extending in a direction transverse to the longitudinal direction of the vehicle;
an upper member secured to the base member, the upper member comprising a left side portion, a right side portion and a top portion extending between and interconnecting the left side portion and the right side portion, the upper member being configured for protecting passengers in the event the vehicle rolls over; and
an armrest member secured to the upper member, the armrest member comprising first and second armrests spaced apart from one another, the first and second armrests each comprising first and second portions that are integral with one another, the armrest member further comprising a connecting portion extending between and interconnecting the first and second armrests; wherein
the connecting portion is configured for mounting to the frame at a location spaced apart from the base member and the upper member;
the connecting portion extends substantially parallel with the base member;
the second portion of the first armrest is substantially parallel with each of the left side portion and the right side portion of the upper member and is substantially perpendicular to each of the first portion of the first armrest and the connecting portion; and the second portion of the second armrest is substantially parallel with each of the left side portion and the right side portion of the upper member and is substantially perpendicular to each of the first portion of the second armrest and the connecting portion.

28. The roll bar assembly of claim 27, wherein:

the first portion of the first armrest is substantially perpendicular to the left side portion of the upper member;

the first portion of the second armrest is substantially perpendicular to the right side portion of the upper member; and the top portion of the upper member is substantially parallel with at least one of the connecting portion of the armrest member and the base member.

\* \* \* \* \*